United States Patent [19]

Day

[11] 4,209,089
[45] Jun. 24, 1980

[54] COMPOSITE FEEDER BELT

[75] Inventor: John T. Day, Westminster, Md.

[73] Assignees: Rubber Millers, Inc., Baltimore, Md.; Koppers Company, Inc., Pittsburgh, Pa.

[21] Appl. No.: 949,054

[22] Filed: Oct. 6, 1978

[51] Int. Cl.² .............................................. F16G 1/00
[52] U.S. Cl. ............................ 198/847; 74/231 P; 74/237; 428/247; 428/256; 428/284; 428/295; 428/424.6
[58] Field of Search .............. 428/247, 255, 256, 260, 428/295, 420, 423, 424, 425, 268, 269, 295, 284, 261, 317; 74/231 P, 237, 232; 198/847

[56] References Cited

U.S. PATENT DOCUMENTS

| | | | |
|---|---|---|---|
| 2,650,184 | 8/1953 | Biefield | 428/268 |
| 2,930,104 | 3/1960 | Watts et al. | 428/269 |
| 3,063,884 | 11/1962 | Glover et al. | 198/847 |
| 3,731,449 | 5/1973 | Kephart et al. | 428/256 |
| 3,738,859 | 6/1973 | Anderson | 74/231 P |
| 3,929,026 | 12/1975 | Hofmann | 198/847 |
| 3,960,999 | 6/1976 | Massie | 428/256 |
| 4,019,941 | 4/1977 | Prime et al. | 198/847 |
| 4,029,837 | 6/1977 | Leatherman | 428/269 |
| 4,107,370 | 8/1978 | Ingraham | 428/247 |
| 4,109,543 | 8/1978 | Foti | 74/231 P |
| 4,142,017 | 2/1979 | Blackburn et al. | 428/247 |

*Primary Examiner*—James J. Bell
*Attorney, Agent, or Firm*—Thomas L. Sivak; Oscar B. Brumback

[57] ABSTRACT

An improved composite feeder belt for use in transporting and handling minerals or the like wherein the belt is comprised of a low modulus, abrasion resistant urethane containing a reinforcement of free floating, spaced encapsulated yarns. The yarns are woven in the form of a scrim and are treated to prevent penetration of the liquid urethane into the filament bundles during manufacture of the belt and also to inhibit adhesion of the urethane to the yarns.

15 Claims, 1 Drawing Figure

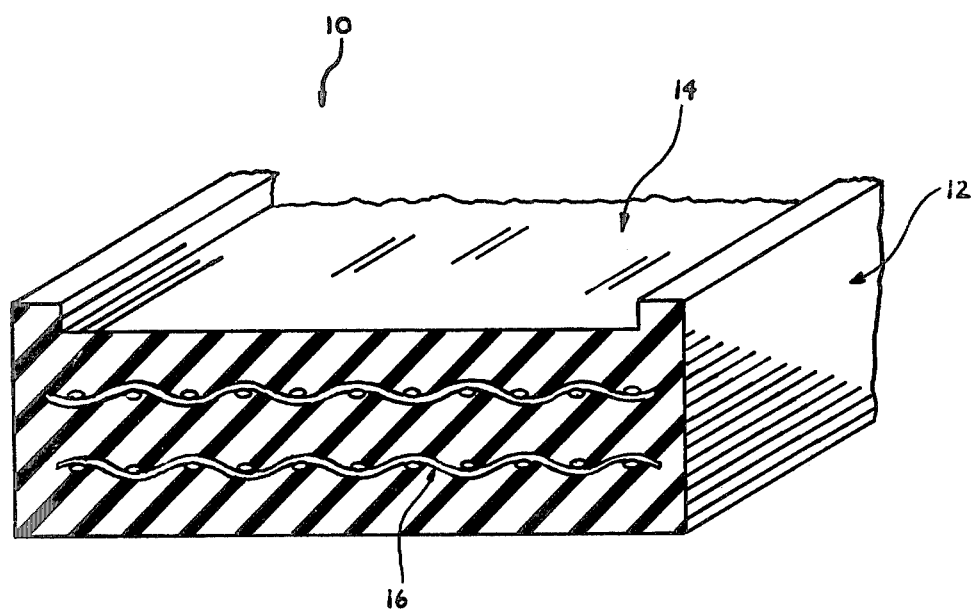

COMPOSITE FEEDER BELT

BACKGROUND OF THE INVENTION

1. Field of the Invention

This invention relates to feeder belts and, more particularly, to feeder belts used in the handling and transport of minerals.

2. Description of the Prior Art

Generally, feeder belts used in the mineral processing industry have been made of natural rubber with a cotton cord reinforcement. Over the past several years, it has been increasingly difficult to obtain an adequate supply of quality natural rubber belts. It is the understanding of the mineral processing industry that the costs of raw materials and the cost of fabricating the natural rubber feeder belts have caused certain manufacturers to cease production of the natural rubber belts. While certain natural rubber belts are still available, it has been found that these do not perform satisfactorily in that they fail prematurely. This limited operating life necessitates frequent belt changes which require frequent equipment shutdowns. Limited belt life not only causes the industry to incur higher costs from belt replacement but also from interruptions in production.

Synthetic rubbers (such as ADIPRENE urethane rubber) have been suggested for use as a material handling conveyor belt. However, it does not appear that such synthetics have found widespread use in the mineral processing industry.

It has now been found that if synthetic belts are reinforced with a free floating, encapsulated scrim, the belts are accepted as material handling conveyor belts. Accordingly, the objects of the present invention include a feeder belt that is competitive in initial cost with existing natural rubber feeder belts and a feeder belt that will have an extended operation life.

SUMMARY OF THE INVENTION

These and other objects of the invention are achieved by providing a composite feeder belt comprised of a low mudulus, abrasion resistant urethane having a reinforcement of free floating, longitudinally spaced, encapsulated fibers. The fibers are treated to prevent penetration of the liquid urethane into the filament bundles and to also inhibit adhesion of the urethane to the yarns.

BRIEF DESCRIPTION OF THE DRAWING

The FIGURE shows a perspective view of a urethane belt made in accordance with the teachings of the present invention but not to scale, so as to emphasize certain portions such as the reinforcing fiber.

DESCRIPTION OF THE PREFERRED EMBODIMENT

Referring to the FIGURE, a feeder belt generally designated 10 has a body comprised of urethane having a free floating reinforcement of spaced, encapsulated fibers.

In the preferred embodiment the urethane is a toluene diisocyanate polyethylene adipate aduct, the prepolymer is reacted with 4,4'-methylene-bis (2-chloroaniline), the curative. The proportion of curative to prepolymer ranges from 6 to 9 parts of curative to 100 parts prepolymer. In the preferred embodiment the ratio is 7 parts curative to 100 parts prepolymer to give a stoichiometric ratio of 0.9 to 1. The hardness of the urethane is 70 durometers Shore A and has an ultimate tensile strength of 6600 psi.

In the preferred embodiment, within the urethane body 12 at the neutral axis of the web 14 portion of the belt are two layers of scrim 16. Each scrim 16 has a yarn count of 10 by 10 per inch, warp and fill. The yarn size is 1000 denier by 1000 denier for both the warp and fill. In each yarn there are 192 filaments and the weave of the scrim is plain. Each of the scrim 16 extend the entire width and length of the urethane body. Each scrim 16 is treated with material such as a polyvinyl chloride resin to prevent liquid urethane from entering the individual bundles and bonding the individual filaments together. Such bonding of the individual filaments would stiffen and weaken the bundle. The treatment also inhibits the urethane from adhering to the scrim material, allowing the bundles to slip and move within the body, thereby permitting the tear stresses and other stresses induced in the belt to be distributed over the bundles. Preferably the scrim is treated with a bath of polyvinyl chloride plasticized with dioctyl phosphate so that the treatment accounts for 20 percent of the weight of the scrim. It is to be understood that in other embodiments of my invention the free floating, encapsulated reinforcement could be a steel or copper screen. The reinforcement could also be a non-woven mesh fabric.

While I have described certain preferred embodiments of my invention, it will be understood that it may otherwise be embodied within the scope of the following claims.

What is claimed:

1. A feeder belt for transporting and handling minerals and the like comprising a urethane body having a free floating reinforcement encapsulated therein extending generally along the line of travel of said belt.

2. The feeder belt of claim 1 wherein said reinforcement is comprised of a plurality of longitudinally spaced fiber bundles.

3. The feeder belt of claim 1 wherein said reinforcement is a scrim.

4. The feeder belt of claim 2 wherein said fiber bundles are treated with means for inhibiting adhesion of said urethane to said bundles.

5. The feeder belt of claim 4 wherein said means for treating said fiber bundles is a polyvinyl chloride plasticized with a dioctyl phosphate.

6. The feeder belt of claim 3 wherein said scrim is treated with means for inhibiting adhesion of said urethane to said scrim.

7. The feeder belt of claim 6 wherein said means for treating said scrim is a polyvinyl chloride plasticized with a dioctyl phosphate.

8. A feeder belt for transporting and handling minerals and the like comprised of a body comprised of a prepolymer, toluene diisocyanate polyethylene adipate aduct reacted with a curative, 4,4'-methylene-bis (2-chloroaniline), and a free floating reinforcement of spaced, encapsulated fibers, said fibers being treated with a polyvinyl chloride resin.

9. The feeder belt of claim 8 wherein the proportion of curative to prepolymer ranges from 6 to 9 parts of curative to 100 parts prepolymer.

10. The feeder belt of claim 9 wherein the encapsulated fiber is treated with a polyvinyl chloride plasticized with dioctyl phosphate.

11. The feeder belt of claim 10 wherein said encapsulated fibers are in the form of a scrim.

12. The feeder belt of claim 10 wherein said encapsulated fibers are in the form of a non-woven fabric.

13. The feeder belt of claim 10 wherein said encapsulated fibers are in the form of a metallic mesh.

14. The feeder belt of claim 4 wherein said encapsulated fiber bundles comprise a non-woven fabric.

15. The feeder belt of claim 4 wherein said encapsulated fiber bundles comprise a metallic mesh.